United States Patent [19]

Bush et al.

[11] Patent Number: 5,502,797
[45] Date of Patent: Mar. 26, 1996

[54] APPARATUS WITH FLASH MEMORY CONTROL FOR REVISION

[75] Inventors: Craig P. Bush; Cyrus B. Clarke; David B. Langer, all of Lexington, Ky.

[73] Assignee: Lexmark International, Inc., Greenwich, Conn.

[21] Appl. No.: 317,444

[22] Filed: Oct. 4, 1994

[51] Int. Cl.$^6$ .................................................. G06H 15/00
[52] U.S. Cl. ............................................ 395/115; 395/116
[58] Field of Search ................................... 395/115, 102, 395/116, 117, 162; 400/68; 358/296

[56] References Cited

U.S. PATENT DOCUMENTS

| | | | |
|---|---|---|---|
| 5,239,621 | 8/1993 | Brown, III et al. | 395/115 |
| 5,241,397 | 8/1993 | Yamada | 358/296 |
| 5,295,233 | 3/1994 | Ota | 395/115 |
| 5,307,458 | 4/1994 | Freiburg et al. | 395/162 |
| 5,321,840 | 6/1994 | Ahlin et al. | 395/700 |
| 5,374,130 | 12/1994 | Hirono | 400/68 |
| 5,381,379 | 1/1995 | Fukumoto | 365/238.5 |
| 5,389,567 | 2/1995 | Acovic et al. | 437/52 |
| 5,396,455 | 3/1995 | Brady et al. | 365/170 |

*Primary Examiner*—Raymond J. Bayerl
*Assistant Examiner*—Steven P. Sax
*Attorney, Agent, or Firm*—John A. Brady

[57] ABSTRACT

Printer (1) receives revised operating code in flash memory (19). To preserve offset adjustment unique to the printer, the values in new operating code are compared with those in the previous code, and new offsets preserving the previous offsets are stored in permanent memory (21). The use of permanent memory is minimized by basing the calculation on changes from start of production.

2 Claims, 1 Drawing Sheet

APPARATUS WITH FLASH MEMORY CONTROL FOR REVISION

TECHNICAL FIELD

This invention relates to apparatus controlled by software stored in the apparatus and executed by a central data processor such as a microprocessor. Typical of such an apparatus is a laser printer or ink jet printer. Control of such apparatus is modified by changing the stored control code, but this has typically required a physical change of the memory. This invention makes possible the effective change by use of flash memory which is programmable random access memory comparable in cost and function to standard dynamic random access memory (commonly known as DRAM).

BACKGROUND OF THE INVENTION

Control code for apparatus is now not changed after it leaves the factory or is changed completely without regard to any operator-input or unique-adjustment code. A prior network adapter sold by the assignee of this invention contains its control code in flash memory and that code is revised in total by simply changing the code in flash memory. U.S. Pat. No. 5,321,840 to Ahlin et al transmits revision code to special purpose personal computers from host to flash memory. Neither this patent nor the network adapter involves revising control data in non volatile memory (NVRAM) as does this invention.

Typically, flash memory is not used to revise control code. However, some computers may have their BIOS (basic import output system) in flash for its revision. Commonly, new control code is installed by installing new memory storing the new control code in the connections of the former memory. One time programmable memory (typically, EPROM's) is often used during the early period of a new apparatus rather than cheaper, fixed read only memory circuits since revision can be made in the code without scrapping any memory circuits. Apparatus which is in use may be modified by replacing the existing memory with such programmable memory.

No such revision addresses the preservations of earlier inputs specific to each apparatus. Such inputs are typically "fine tuning" information applied by skilled technicians in the factory or during maintenance, or inputs made by a skilled operator to satisfy the personal requirements and preferences of the operator. In the preferred embodiment of this application, such inputs are margin adjustments of the printer. Each printer, although within tolerances, has a slightly different overall operation. Accordingly, provision has been made in the control system to enter offset instructions to revise the margins from those which are nominally specified by the standard code. Thus, a factory technician will view actual printing and enter data specifying the amount of offset from what is seen. Each offset increment will be a small, predetermined amount and the amount of offset will typically be only a few of such units. However, the offset will differ for each printer because of the subtle differences between two nominally identical printers.

New control code entered into the printer may redefine other aspects of printing such that the nominal margin is no longer the same as that of the control code for which the earlier offset was specified. For example, new control code may change slightly the recognition of a signal defining the start of a laser sweep across a photoconductor during printing. In accordance with this invention, the previous "fine tuning" of the printer is preserved by retaining the offset as modified to conform in amount to the reference amounts in the new code. No previous such use of flash memory with modification of reference inputs is known.

DISCLOSURE OF THE INVENTION

In accordance with this invention an apparatus controlled by a central processing unit has a flash memory in which the control code is stored. As is standard, the apparatus has a limited capacity to store information in non volatile random access memory (NVRAM), which is expensive and therefore conservatively used. NVRAM can be revised in part like DRAM. Flash memory can be revised in total, but not in part as any erasing requires erasing of the entire memory.

Prior special data, such as margin offsets from nominal, are typically stored in NVRAM. New control code is sent to the apparatus to revise the flash memory to define new nominal information. The control system accesses the previous special data and determines from the new nominal value the corresponding special data. Thus, a new margin offset would be one more than the previous margin offset if the new nominal value is one less. That new special data is stored in NVRAM to replace the prior special data.

The offsets are typically applied at the factory or by a skilled service person, and reflect the unique differences of the apparatus. New control code would specify changes in nominal but other unique differences normally would be unchanged. Accordingly, this invention is particularly applicable at the factory in which standard apparatus which have received their offset information have special code then entered before leaving the factory. It is also particularly useful when skilled service is not practical, such as when a network administrator changes the control code of an apparatus on a network where the network administrator can not observe the operation of the apparatus.

BRIEF DESCRIPTION OF THE DRAWING

The details of this invention will be described in connection with the accompanying drawing, in which is illustrative of a printer employing this invention.

BEST MODE FOR CARRYING OUT THE INVENTION

Typical Printer

Figure 1:
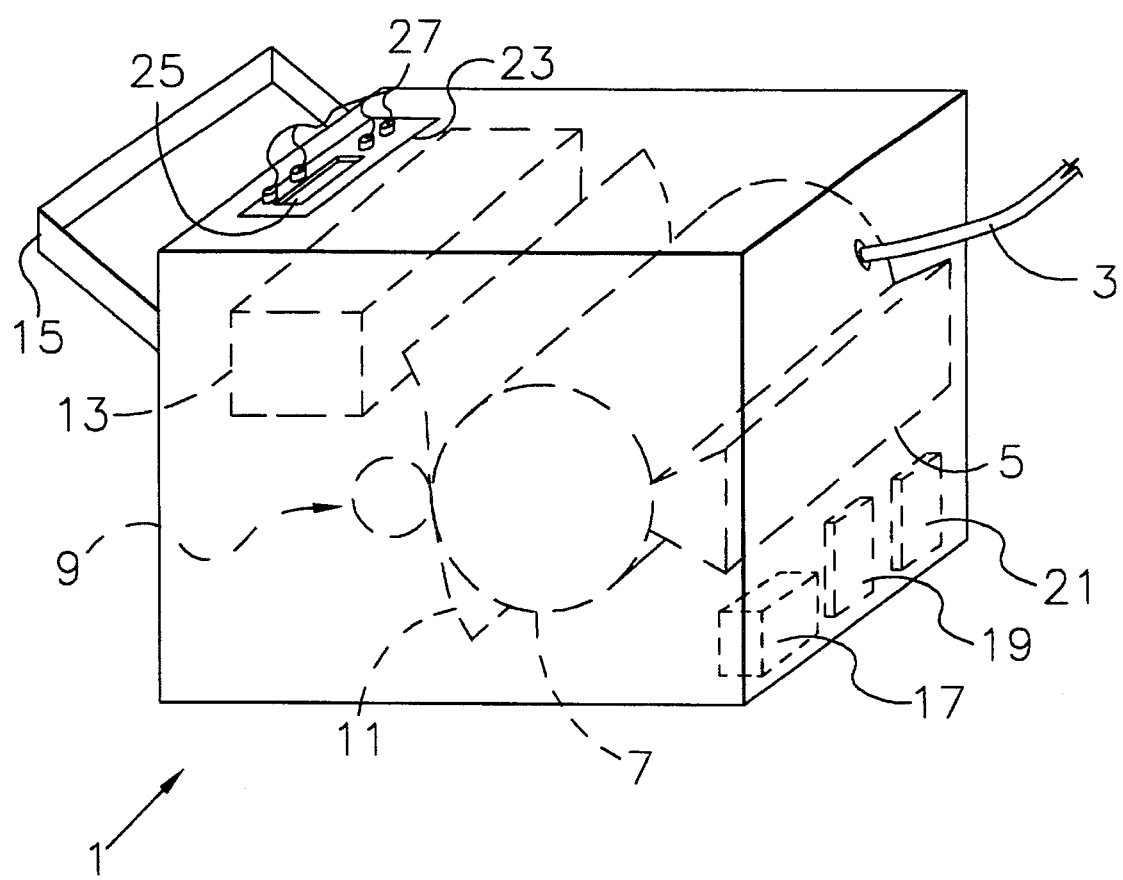

A typical printer is shown in FIG. 1. Page and control information is received by printer 1 in a standard manner from a communications cable 3. Printer 1 has an optical system 5, which typically may be a laser beam sweeping horizontally across a photoconductive drum 7. Drum 7 transfer images defined by optical system 5 at transfer station 9 to paper 11. The image is fixed, typically by heat, at fixing station 13, and the finished printed page is delivered to output tray 15.

Electronic data processor 17 in printer 1 monitors all the information received on cable 3 and interprets the page data to control optical system 5 with image data and to otherwise control the operation of printer 1. Memory 19 is a standard flash memory. Memory 21 is a standard NVRAM memory.

Flash memory is characterized by its ease and economy of use comparable to dynamic random access memory, its storing of data during the absence of power (power off), and its ability to be erased and then reused (erasure resets the entire flash memory).

NVRAM is easy to use and may be modified in part down to a single cell (individual bits may be modified). However, it is expensive and is therefore used sparingly. Typically, NVRAM functions without need for power to continue to store data. NVRAM employing electrical storage batteries (known as battery back-up) is an alternative within the intended meaning of NVRAM.

Finally, printer 1 has a control panel 23 for use by an operator of printer 1. Control panel 23 has a display 25 and input keys or the like 27.

For some laser printers 1, the registration of the printed image is adjusted by entering-several adjustment parameter values from the operator panel. Such these parameters are: top margin, bottom margin, left margin, and duplex top margin. The top margin parameter adjusts the position of the first printed scan line at the top of the page. The bottom margin parameter adjusts the position of the last printed scan line at the bottom of the page. The left margin parameter shifts the image left or right. The duplex top margin parameter further adjusts the position of the first scan line, but only for sheets that will be fed into the duplexer (for printing on both sides). This last adjustment is used to improve the relative registration between the front and back side of duplexed sheets. These adjustment values are all stored in the printer. The margin adjustments are done on each printer as a part of the manufacturing process. The margin adjustments are also typically available to the servicer and operator through control panel 23 from the "diagnostics menus" on display 25.

In the process of printing a page, the printer engine code applies the margin adjustment parameters, described above, to corresponding nominal margin values that are contained in the engine code. The positioning of the printed image is the net effect of the nominal margin values and the adjustment values. Engine code versions that are introduced after the start of production for a given printer will very often contain changes to the nominal margin values. The nominal margin values are usually changed to minimize the sizes of the adjustments that production personnel must make on the manufacturing line, hence saving production time. Thus, the nominal margin values contained in one engine code version may differ from those in another version. Therefore, the margin adjustments stored in NVRAM 21 may become invalid when the engine code version is changed in a given printer. Upgrading engine code may force the user to enter the diagnostics menus and then make several margin adjustments to the printer to obtain acceptable print registration once again. A stored set of adjustments that are perfect when printing with one version of engine code may yield poor print registration when used with some other engine code version.

This problem is a serious obstacle in realizing the main benefit of using flash memory 19 for the engine code. That benefit is the relative ease of reprogramming the engine code to a different version, both in the factory and in the customer environment. This invention eliminates the described lost registration problem. Without this solution, the reprogramming of the engine flash memory 19 contents could potentially ruin the print registration of the reprogrammed printer 1. A solution is particularly valuable for a network-connected printer since the engine code can be upgraded over the network, with the upgrade performed by a user at some location remote from the printer. In such an environment it may be inconvenient for the user to visit the machine to fix the print registration.

In the preferred printer 1, the raster image processor (RIP) and the engine microcontroller are on two separate circuit boards, or "cards" (these processors are shown collectively as 17 in the drawing). The RIP processor, engine microcontroller, operator panel microcontroller, and printer NVRAM 21 are all interconnected on an industry standard bus. The RIP is the bus master in the preferred printer 1. Although the printer NVRAM 21 is located on the engine card, all accesses to the NVRAM 21 are done by the RIP processor. The engine cannot directly access the NVRAM 21.

The bus design is primarily a hardware-level protocol. A higher-level interface protocol exists between the RIP and engine. This interface protocol is unique to the preferred printer 1, and can be named the R/E interface. The R/E interface is a master slave type of interface, with the RIP as the master and the engine as the slave. A set of commands that the RIP can send to the engine is defined. Each command adheres to the same basic format. For each command, the RiP sends a predefined number of bytes to the engine, and then the engine responds with a predefined number of bytes, all in one bus transaction. Since the RIP is both the bus master, and the R/E master, it may send a R/E command to the engine at any time. However, the engine cannot asynchronously "send" bytes of data to the RIP. To allow the engine to initiate a transaction on the interface, a signal line from the engine to the RIP exists that is not a part of the standard bus. This signal line is the "Notify" line. To initiate a transaction, the engine asserts the Notify line, which interrupts the RIP processor. The RIP then sends a query to the engine which allows the engine to communicate the necessary information or event to the RIP.

The main code store for the engine microcontroller is 64 Kbyte flash memory module 19. This flash memory module is on the engine card. The preferred printer 1 is architected to allow easy programming of the engine code that is stored in the engine flash memory 19. Support exists in the datastream, the RIP software, and in the engine hardware and software to allow the programming of the engine flash memory 19. The engine also contains a smaller amount of microcode that is contained in the microcontroller itself. This code is called the "boot code", and is not volatile. The boot code is programmed into the engine microcontroller at some point in time before the microcontroller part is soldered onto the engine card. The primary purpose of the boot code is to provide the engine microcontroller the code it needs to program the engine flash memory 19. The boot code is executed when the printer is powered on, during subsequent "warm boot" sequences, and when the flash memory 19 is being programmed. The boot code supports both the initial programming of a previously unprogrammed engine flash memory, and the reprogramming of the flash memory after it has already contained an engine code version. A "warm boot" sequence is essentially equivalent to an engine power on reset (POR), but it is initiated by the RIP software, not by an actual powering-on of the printer 1.

Also, the "bottom margin" adjustment value that is entered from the operator panel, and stored in NVRAM 21, is actually used by the engine code to modify the speed of the transport mechanism of paper 1 with respect to the imaging elements 5 and 7. For simplicity, the rest of this description will be written as if the engine code contains a nominal value for the bottom margin, but in reality the engine code applies the bottom margin adjustment value to the nominal transport speed value. This alters the transport speed, and hence the location of the last printed scan at the bottom of the page. Also, noted above is the fact that the engine cannot "send" an actual message to the RIP spontaneously, because the RIP is the interface master—the engine can only respond on the bus. So, the engine asserts the Notify line to cause the RIP to query the engine. However, at certain points throughout this description, the technical descriptions may be worded as if the engine can "send" data to the RIP. This abstraction is used to attempt to make the description clearer and less cumbersome. The actual assertion of the Notify line and the subsequent RIP query will be identified where necessary.

As described above, each engine code version contains a nominal value for each of the four margin parameters. To implement the invention, each engine code version also contains a "change-from-SOP" value ("SOP" stands for "start of production"), for each of the four margin parameters. For each nominal margin value, the change-from-SOP value equals, or can be used to derive, the difference in the nominal margin value between that in the code version udder discussion and the value that was contained in the very first shipped engine code version, at the start of production. The change-from-SOP values are stored in NVRAM 21.

Reprogramming the Engine Flash Memory

For ease in description, first will be described the operation when the engine flash 19 is re-programmed. The initial conditions in this scenario are that 1) the engine flash memory 19 already contains a functional engine code version (this version will be called the "current" code version), 2) the NVRAM 21 contains valid change-from-SOP values from the immediately previous engine code version, 3) the NVRAM 21 contains margin adjustments that are valid with the current engine code version. Other scenarios, such as the situation in which there is no valid engine code in the flash memory 19, will be discussed subsequently.

To start the engine flash 19 reprogramming operation, the engine code execution returns to the boot code, since the flash memory 19 will be erased. The engine and RIP then implement a sequence of commands and protocol that program the engine flash memory with the version of engine code that has been downloaded on cable 3 to the RIP from a host computer (this version will be called the "new" code version). When the reprogramming is complete, the RIP causes the engine to do a warm boot, starting with the Engine Restart command. The sequence of commands that follows allows the new engine code to determine if it must recalculate new margin adjustment values, and then have the RIP store them into NVRAM. This command sequence is shown in Table 1.

TABLE 1

| ORDER | RIP/ENGINE INTERFACE | COMMENTS |
| --- | --- | --- |
| 1. | Engine Restart command | On a warm boot following engine flash reprogramming, the engine processor is executing out of the boot code store at this point. |
| 2. | several non-pertinent commands | Several commands follow that are necessary for initializing the interface and engine code. They are not relevant to this disclosure. |
| 3. | Enable Flash Execution command | This command enables the engine code execution to jump from the boot code to the code stored in engine flash memory. |
| 4. | some more non-pertinent commands | A few more commands are sent that are not relevant to this disclosure. |
| 5. | Set Engine Private Data command | The RIP sends the engine 8 bytes of data from the NVRAM. Included in these 8 bytes are the 4 change-from-SOP bytes for the margins. |

TABLE 1-continued

| ORDER | RIP/ENGINE INTERFACE | COMMENTS |
| --- | --- | --- |
| 6. | Set Engine POR Parameters command | The RIP sends the engine 6 bytes of data. Included in these 6 bytes are the 4 margin adjustment settings from NVRAM. |
| 7. | Check for New Registration Settings command | The engine can answer "yes" or "no". In this programming scenario, the engine will answer "yes" if new margin adjustments must be recalculated. |
| 8. | Query New Registrations Settings command - only if the engine responded "yes" to the previous command | The RIP sends this command only if the engine responded "yes" to the previous command. The engine returns 4 bytes of data, which are the new, recalculated margin adjustments. The RIP then stores these into NVRAM. |
| 9. | several non-pertinent commands | |
| 10. | Set Engine Mode | This command tells the engine that it can start the transport and mirror motor now. |
| 11. | Now Querying Notifies | The RIP is now able to service the assertion of the Notify line. Prior to this point in the boot sequence, the engine does not assert the Notify line. |
| *** | This is technically the end of the POR/Warm Boot sequence. | However, some following commands ARE pertinent to this disclosure. |
| 12. | engine asserts the Notify line | If the engine needs to store new change-from-SOP values into the NVRAM, then it will assert the Notify line to initiate this process. |
| 13. | Query Notify command | The engine responds with the "Engine Data Change" notify response. This tells the RIP that it must next query the engine to obtain the new data. |
| 14. | Query Engine Private Data command | The engine returns 8 bytes of data. Included in these 8 bytes are the 4 new change-from-SOP bytes for the margins. The RIP will then store these 8 bytes into the NVRAM. |

The Enable Flash Execution command causes the engine code execution to jump from the boot code to the new engine code in flash memory 19. At this point in time, the NVRAM 21 still contains the margin adjustments and change-from-SOP values from the old engine code version. The Set Engine Private Data command passes the old change-from-SOP values to the engine processor 17. The Set Engine POR Parameters command passes the old margin adjustments to the engine processor 17. The Check for New Registration Settings command allows the engine processor 17 to indicate whether it wishes to recalculate the margin adjustments. This command causes the engine processor 17 to compare the old change-from-SOP values to the new change-from-SOP values contained within the new engine code. If any of the new change-from-SOP values differ from the corresponding old value, then the engine processor 17 will recalculate the margin adjustments, and will return a "yes" response to indicate that the margin adjustments must be updated. Since the engine processor 17 has indicated that new adjustment values are available, the RIP processor 17 sends the Query New Registration Settings command to fetch the new margin adjustment values. The RIP processor 17 then stores these new values into the NVRAM 21, in place of the old values. Note that the engine processor 17 will answer "yes" to the Query. New Registration Settings command ONLY during the warm boot that immediately follows the programming of the engine flash memory 19. After the rest of the warm boot sequence has finished, the engine asserts the Notify line to force a query from the RIP processor 17. The engine informs the RIP that it has new "private data" for the RIP to store into NVRAM 21. The RIP processor 17 then queries for the new data, which includes the new change-from-SOP values that are contained in the new engine code, and stores these new values into the NVRAM 21. So, now the initial conditions are correct for any subsequent reprogramming of the engine flash: valid margin adjustments and change-from-SOP data are stored in the NVRAM 19.

The following is additional detail, and will use a hypothetical example to assist in the description. Tables 2, 3, and 4 show the status of the pertinent variables in the flash-memory 19-base engine code and in the NVRAM 21 as the steps of the algorithm progress. Although Tables 2, 3, and 4 show only the top margin parameter for the sake of clarity, the same logic applies to the other three parameters as well.

TABLE 2

Engine Code and Printer NVRAM Before Engine Flash Reprogramming Operation

| Old Engine Code Version contains: | Printer NVRAM contains: |
|---|---|
| Nominal Top Margin = 166 Top Margin Change-From-SOP = 3 | Top Margin Adjustment = 2 Top Margin Change-From-SOP = 3 |

For this example, SOP Nominal Top Margin = 163 ("SOP" stands for "start of production")
The Current Net Top Margin = 166 + 2 = 168.

For this example, SOP Nominal Top Margin=163 ("SOP" stands for "start of production")

The Current Net Top Margin=166+2=168.

TABLE 3

Engine Code and Printer NVRAM Before Warm Boot, Following Engine Flash Reprogramming

| New Engine Code Version contains: | Printer NVRAM contains: |
|---|---|
| Nominal Top Margin = 162 Top Margin Change-From-SOP = −1 | Top Margin Adjustment = 2 Top Margin Change-From-SOP = 3 |

The engine code has been reprogrammed, but NVRAM has not yet been updated.

TABLE 4

Engine Code and Printer NVRAM After Warm Boot, Following Engine Flash Reprogramming

| New Engine Code Version contains: | Printer NVRAM contains: |
|---|---|
| Nominal Top Margin = 162 Top Margin Change-From-SOP = −1 | Top Margin Adjustment = 6 Top Margin Change-From-SOP = −1 |

The engine code has been reprogrammed, and NVRAM has now been updated.

The engine code has used Equation 6 (below) to calculate the new Top Margin Adjustment value of 6. In doing so the NVRAM need not store the large number for nominal top margin.

The new Net Top Margin=162+6=168.

The Previous Net Top Margin=166+2=168.

Thus, the margin adjustment is preserved.

Assume that the printer initially contains the "old" engine code version. Table 2 shows the nominal top margin value and change-from-SOP values contained in the old engine code. The NVRAM contains valid margin adjustments and the correct change-from-SOP values, corresponding to the old engine code version, as shown in Table 2. Immediately after the engine code in flash memory 19 has been reprogrammed, and BEFORE the subsequent warm boot, the flash 19 and NVRAM 21 will contain values as shown in Table 3. At this point in time, the flash 19 contains the new engine code version, but the new engine code has not yet had an opportunity to update the NVRAM 21. Finally, after the Query New Registration Settings command and the Query Engine Private Data command of Table 2 have been executed, the NVRAM 19 is fully updated as shown in Table 4, preserving the net print registration offset from nominal that existed before the engine flash reprogramming operation.

As stated above, the Check for New Registration Settings command causes the engine to compare the old change-from-SOP values to the new change-from-SOP values contained within the new engine code. If any of the new change-from-SOP values differs from the corresponding old value, then the data processor 17 will recalculate the margin adjustments. The engine code uses Equation 5 below to do the calculation. The derivation of Equation 5 is now given. Once again, the explanation is given for the top margin calculation, but the methodology applies to all four margin parameters. Equation 1 defines a "Net Top Margin" which is the sum of the nominal top margin value contained in the current code, and the top margin adjustment which is stored in NVRAM 21. This Net Top Margin is the effective top margin that the user actually sees on paper. To restore the print registration after an engine reprogramming operation, the Net Top Margin must be restored. This is shown in Equation 2. The mathematical definition of the top margin change-from-SOP value is given in Equation 3.

Equation 1

Current Net Top Margin = Current Nominal Top Margin + Current Top Margin Adjustment Equation 2

New Net Top Margin = New Nominal Top Margin + New Top Margin Adjustment = Previous Net Top Margin.

Equation 3

Current (or Previous or New) Top Margin Change-From-SOP = Current (or Previous or New) Nominal Top Margin − SOP Nominal Top Margin,
    where: "SOP Nominal Top Margin" is the Nominal Top Margin value contained in the start-of-production engine code.
Using Eqn. 1 and Eqn. 2, we obtain
New Nominal Top Margin + New Top Margin Adjustment = Previous Nominal Top Margin + Previous Current Top Margin Adjustment,
and then Equation 4

New Top Margin Adjustment = Previous Top Margin Adjustment + Previous Nominal Top Margin − New Nominal Top Margin.

-continued

Applying Eqn. 3, we obtain
Equation 5

New Top Margin Adjustment = Previous Top Margin
Adjustment + SOP Nominal Top Margin +
Previous Top Margin Change-From-SOP −
SOP Nominal Top Margin − New Top
Margin Change-From-SOP and finally
Equation 6

New Top Margin Adjustment = Previous Top Margin
Adjustment + Previous Top Margin
Change-From-SOP − New Top Margin
Change-From-SOP Equation 6 is the calculation used in the preferred printer 1 when calculating a new top margin adjustment value. This conserves NVRAM 21 because the change-from-SOP numbers and the margin offset numbers are small. In the preferred printer 1 engine code, the engine always scales the bottom margin adjustment value that is passed from the RIP, and then applies it to the nominal transport speed value. This fact forces the need for some scaling at certain intermediate points in the calculation of the new bottom margin adjustment, but the basic logic is the same as described above for the top margin.

Note that similar logic could be used to calculate new margin adjustment values based on Equation 4 above. This variation on the methology would use the old and new nominal margin values, instead of the change-from-SOP values. The variant based on Equation 4 would therefore force storage of the nominal margin values in the NVRAM 21. Since at least two of the nominal margin values are two-byte quantities, use of Equation 6 conserves the number of NVRAM 21 bytes needed to support this print registration restoration scheme.

Initial Conditions

Three initial conditions were assumed to exist, at the onset of an engine flash memory 19 reprogramming operation in the above explanation of the print registration restoration algorithm. These initial conditions were 1) the engine flash memory 19 already contains a functional engine code version, 2) the NVRAM 21 contains valid change-from-SOP values from that same version of engine code, 3) the NVRAM 21 contains margin adjustments that are valid with that same engine code version. The following describes how these initial conditions are achieved in the manufacturing process of preferred printer 1.

Each engine card actually receives its first engine code version as a part of the card-test operation, at the end of the card manufacturing line. The NVRAM 21, which is on the engine card, is not fully initialized at this time. Note that a special version of RIP code is used at this step in the card manufacturing process. A few special bytes are written to the NVRAM 21 which will, later, on the machine manufacturing line, cause the real RIP that is installed in the machine to decide that the NVRAM is uninitialized. So, engine cards ready for the manufacturing line contain a valid engine code version, and an uninitialized NVRAM. This satisfies the first required initial condition.

When a machine is powered-on for the first time on the manufacturing line, the installed RIP decides that the NVRAM 21 is uninitialized, and then proceeds to initialize and clear most of the NVRAM 21, including the change-from-SOP values and the margin adjustments. This initializing/clearing of the NVRAM 21 occurs before the RIP begins sending commands to the engine. So, now the machine has valid engine code in the flash 19 and an initialized, but cleared, NVRAM 21.

On every real POR that the engine executes, and on every warm boot operation (including the warm boot following an engine flash reprogramming), the engine will cause the correct and valid change-from-SOP values to be stored into the NVRAM 21. Therefore, in the manufacturing line scenario being described, immediately after the RIP has cleared NVRAM 21, the engine performs its first POR operation and causes valid change-from-SOP data to be stored into the NVRAM in the process. This satisfies the second required initial condition.

More specifically the sequence of commands that is sent by the RIP on every machine POR, and on every warm boot of the engine is shown in Table 1. This same sequence of commands applies to the warm boot that occurs after the flash 19 is reprogrammed in this sequence, the RIP processor 17 sends the engine the change-from SOP values that are currently stored in the NVRAM 21. If the NVRAM 21 values do not agree with the values that are contained within the engine code, then the engine processor 17 will send the correct values to the RIP, and the RIP processor 17 stores these new values in the NVRAM 21. This is shown as step number 14, in Table 1. As described in an earlier section, the engine asserts the Notify line, and then causes the RIP to send the Query Engine Private Data command. The engine returns the new/correct change-from-SOP values to the RIP as a few bytes of the engine's private data, and the RIP processor 17 stores this data into the NVRAM 21.

The engine updates the change-from-SOP values in NVRAM 21 this way on every boot operation.

Finally, with respect to the manufacturing process, printer 1 has, at this point, valid engine code in the flash memory 19 and valid change-from-SOP values in the NVRAM 21. An assembly line operator now sets the correct print registration by entering margin adjustment values through a key 27 of the control panel 23 until the print registration is correct. So, the third initial condition is now met. All of the required initial conditions are in place for the invention algorithm to perform correctly on subsequent engine flash programming operations, as described in the previous section.

This process that is used for manufacturing the preferred printer 1 is not the only sequence of events that will set-up a printer with the required initial conditions for our algorithm. For instance, if the engine flash contained no code on the first machine power-on on the manufacturing line, then the engine flash may be programmed at that time with its initial code load. The RIP software and engine boot code support programming an initially unprogrammed engine flash memory. After the initial engine code load is programmed, the subsequent warm boot will store valid change-from-SOP values into the NVRAM 21, and then an operator will set the print registration.

Alternatives within the spirit and scope of this invention will be apparent and may be anticipated.

We claim:

1. An apparatus controlled by an electronic data processor, an electronic data processor controlling said apparatus, non volatile random access memory capable of storing data which can be revised in part by said central data processor and capable of being selectively accessed for stored data by said central data processor (NVRAM), a flash memory of characteristics comparable to dynamic random access memory which retains stored data during power-off and which can be revised only by erasing all data of said flash memory, means to store in said NVRAM control data representing offset from current nominal data and data defining the current change from nominal from start of production of current control information, means to store control information in said flash memory based on said nominal data, means to receive from external of said apparatus and store in said flash memory revised control information which also defines new nominal data and the new change from nominal from start of production, means to find the difference of the previous change from nominal from start of production from the new change from nominal from start of production and to add the previous offset to said difference to determine an offset preserving the net offset for said previous current nominal data, and means to store in said NVRAM said determined offset data as new current offset data and said new change from nominal from start of production data.

2. The apparatus of claim 1, in which said apparatus is a printer and said offsets and said nominal data are for a margin of printing by said printer.

* * * * *